US010663739B1

(12) United States Patent
Drinkwater et al.

(10) Patent No.: US 10,663,739 B1
(45) Date of Patent: *May 26, 2020

(54) FACIAL INTERFACE ASSEMBLIES FOR USE WITH HEAD MOUNTED DISPLAYS AND RELATED SYSTEMS AND METHODS

(71) Applicant: Facebook Technologies, LLC, Menlo Park, CA (US)

(72) Inventors: Jared I. Drinkwater, Auburn, WA (US); Robin Michael Miller, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,127

(22) Filed: Feb. 14, 2019

Related U.S. Application Data

(63) Continuation of application No. 14/964,199, filed on Dec. 9, 2015, now Pat. No. 10,209,524.

(Continued)

(51) Int. Cl.
*G02B 27/01* (2006.01)
(52) U.S. Cl.
CPC .. *G02B 27/0176* (2013.01); *G02B 2027/0169* (2013.01); *G02B 2027/0178* (2013.01)
(58) Field of Classification Search
CPC ............... G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012;

(Continued)

(56) References Cited

U.S. PATENT DOCUMENTS 5,486,841 A   1/1996   Hara et al.
5,880,773 A   3/1999   Suzuki
(Continued)

FOREIGN PATENT DOCUMENTS

WO        2016/085394 A1      6/2016

OTHER PUBLICATIONS

U.S. Appl. No. 14/964,199, "Facial Interface Assemblies for Use With Head Mounted Displays" by Drinkwater et al., filed Dec. 9, 2015, 16 pages.

(Continued)

*Primary Examiner* — William R Alexander
*Assistant Examiner* — Henry A Duong
(74) *Attorney, Agent, or Firm* — FisherBroyles, LLP

(57) ABSTRACT

Technology is provided for a facial interface assembly for use with a head mounted display. The facial interface assembly includes a contoured spacer frame and an interchangeable face gasket removably attached to the contoured spacer frame. The contoured spacer frame includes a forehead interface portion, a pair of cheek interface portions, a bridge portion extending between the pair of cheek interface portions, and one or more attachment tabs configured to mate with a housing of the head mounted display. The face gasket includes a high-density foam layer, a low-density foam layer, and a fabric layer.

19 Claims, 11 Drawing Sheets

Related U.S. Application Data

(60) Provisional application No. 62/221,469, filed on Sep. 21, 2015.

(58) Field of Classification Search
CPC .... G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0185; G02B 2027/0187; G02B 2027/019; G02B 2027/0192; G02B 2027/0194; G02B 2027/015; G02B 2027/0152; G02C 5/00; G02C 11/00
USPC ........................................................ 359/630
See application file for complete search history.

(56) References Cited

U.S. PATENT DOCUMENTS

| | | | |
|---|---|---|---|
| 6,254,240 B1 | 7/2001 | Maciejewski et al. | |
| 6,704,141 B1 | 3/2004 | Nowak et al. | |
| 8,355,208 B1 | 1/2013 | Baker et al. | |
| 8,605,008 B1* | 12/2013 | Prest .................. | G02B 27/0176 345/7 |
| 9,529,194 B2 | 12/2016 | Yoo et al. | |
| 2005/0243418 A1 | 11/2005 | La | |
| 2006/0072206 A1 | 4/2006 | Tsuyuki et al. | |
| 2006/0179554 A1 | 8/2006 | Barton | |
| 2011/0225709 A1 | 9/2011 | Saylor et al. | |
| 2012/0255104 A1 | 10/2012 | Didier | |
| 2013/0083391 A1 | 4/2013 | Teetzel et al. | |
| 2015/0103152 A1 | 4/2015 | Qin | |
| 2015/0138645 A1 | 5/2015 | Yoo et al. | |
| 2015/0238361 A1 | 8/2015 | McCulloch et al. | |
| 2016/0011422 A1* | 1/2016 | Thurber .................. | G02B 27/64 345/8 |
| 2016/0158064 A1* | 6/2016 | Favre-Felix ............ | A61F 9/026 2/431 |
| 2017/0082859 A1 | 3/2017 | Drinkwater et al. | |
| 2017/0102546 A1 | 4/2017 | Tempel et al. | |
| 2017/0192198 A1 | 7/2017 | Bristol et al. | |
| 2017/0318281 A1 | 11/2017 | Edlund et al. | |

OTHER PUBLICATIONS

U.S. Appl. No. 15/253,241, "Flexible Membranes Connected to Movable Lenses of Head-Mounted Display Systems and Related Technology" by Bristol et al., filed Aug. 31, 2016, 41 pages.
Non-Final Office Action received for U.S. Appl. No. 15/253,241 dated Oct. 31, 2017, 23 pages.
Non-Final Office action received for U.S. Appl. No. 14/964,199 dated Sep. 21, 2017, 45 pages.
Non-Final Office Action received for U.S. Appl. No. 14/877,848 dated Jul. 2, 2018, 55 pages.
Final Office Action received for U.S. Appl. No. 14/877,848 dated Feb. 20, 2019, 92 pages.
Final Office Action received for U.S. Appl. No. 15/253,241 dated Mar. 22, 2018, 19 pages.
Non-Final Office Action received for U.S. Appl. No. 15/253,241 dated Jul. 3, 2018, 18 pages.
Final Office Action received for U.S. Appl. No. 15/253,241 dated Dec. 11, 2018, 15 pages.
U.S. Appl. No. 14/877,848, "Lens Movement Assemblies for Use With Head Mounted Displays" by Tempel et al., filed Oct. 7, 2015, 42 pages.
Final Office Action received for U.S. Appl. No. 14/964,199 dated May 15, 2018, 38 pages.

* cited by examiner

FACIAL INTERFACE ASSEMBLIES FOR USE WITH HEAD MOUNTED DISPLAYS AND RELATED SYSTEMS AND METHODS

CROSS-REFERENCE TO RELATED APPLICATION

This application is a continuation of U.S. patent application Ser. No. 14/964,199, titled "FACIAL INTERFACE ASSEMBLIES FOR USE WITH HEAD MOUNTED DISPLAYS," filed Dec. 9, 2015, which claims priority to U.S. Provisional Patent Application Ser. No. 62/221,469, titled "FACIAL INTERFACE ASSEMBLIES FOR USE WITH HEAD MOUNTED DISPLAYS," filed Sep. 21, 2015, the entire disclosures of which are incorporated herein by reference.

TECHNICAL FIELD

This patent application is directed to head mounted displays and, more specifically, to the facial interface of a head mounted display.

BACKGROUND

Traditional head mounted displays include a front unit housing having a video display and a pair of lenses positioned next to the video display. When a user positions the front unit against their face, the lenses are positioned as close to the user's eyes as possible to provide the best visual experience. However, if a user wears glasses, the glasses will often interfere with the lenses. Accordingly, users with glasses may experience difficulty or discomfort with traditional head mounted displays. Approximately half the population wears glasses; therefore, there is a need for head mounted displays that can comfortably and conveniently accommodate users with glasses. In addition, various users have different facial structures and shapes. For example, some users may have high cheek bones while others have low cheek bones. As another example, some people have larger noses than others. Accordingly, there is a need for head mounted displays that can accommodate users having different facial structures and shapes.

BRIEF DESCRIPTION OF THE DRAWINGS

Embodiments of the facial interface assemblies introduced herein may be better understood by referring to the following Detailed Description in conjunction with the accompanying drawings, in which like reference numerals indicate identical or functionally similar elements.

Figure 1:
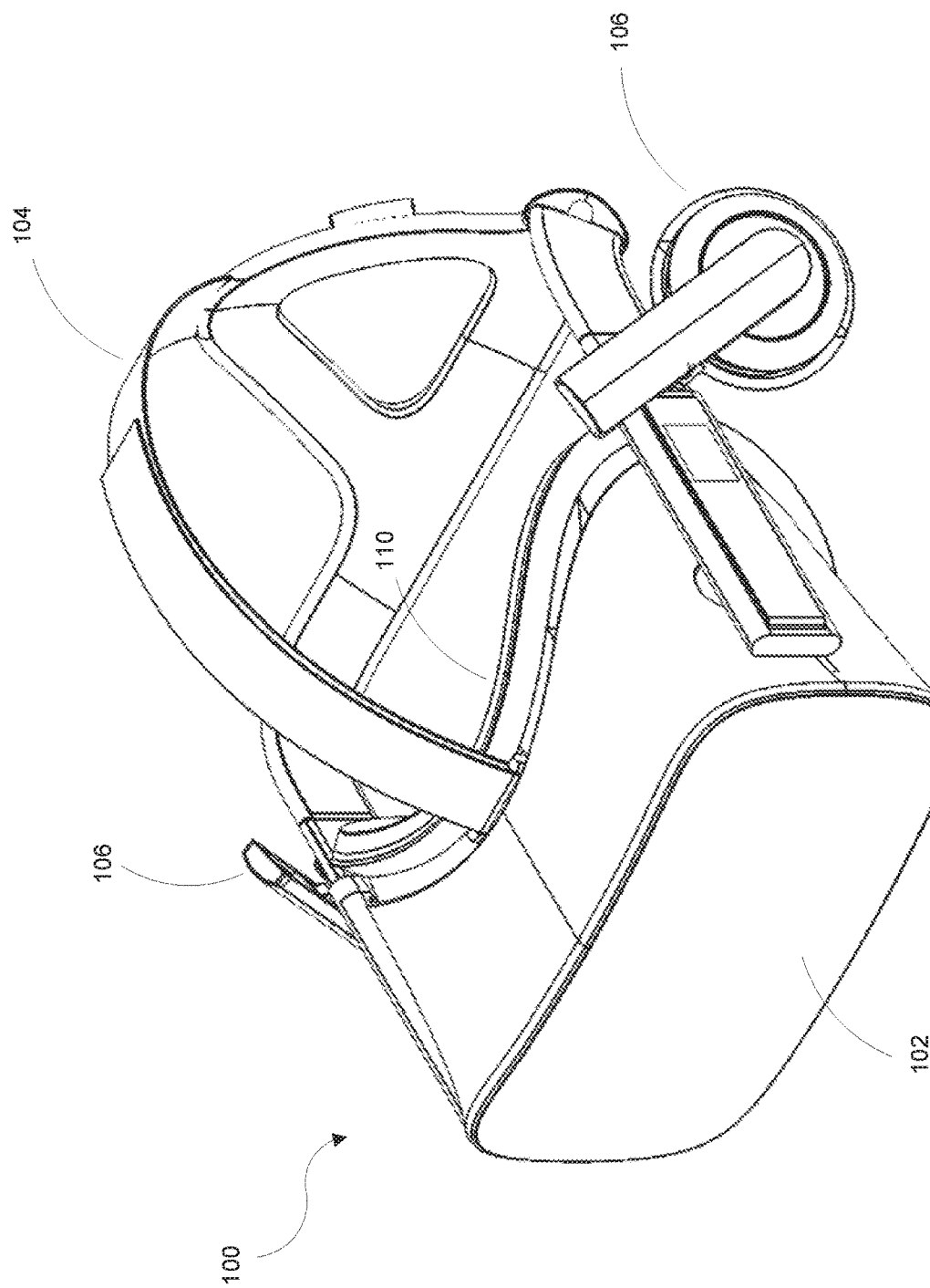
FIG. 1 is an isometric view of a head mounted display according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Facial interface assemblies for use with head mounted displays are disclosed. In an embodiment, a facial interface assembly includes a contoured spacer frame and an interchangeable face gasket removably attached to the contoured spacer frame. The contoured spacer frame includes a forehead interface portion, a pair of cheek interface portions, a bridge portion extending between the pair of cheek interface portions, and one or more attachment tabs configured to mate with a housing of the head mounted display. The face gasket can include a high-density foam layer, a low-density foam layer, and a fabric layer. The face gasket layers can be configured to accommodate users with glasses and users having different facial structures and shapes. By interchanging the face gasket and/or spacer frame of the facial interface assembly a user can set the distance between the lenses of the head mounted display and the user's face.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a head mounted display 100 according to a representative embodiment. The head mounted display 100 includes a display unit 102 with a strap assembly 104 configured to support the head mounted display 100 on a user's head. In some embodiments, the head mounted display 100 includes audio modules 106 positioned on the left and right sides of the strap assembly 104. The head mounted display 100 includes a facial interface assembly 110 to provide a comfortable interface between the display unit 102 and a user's face.

Figure 2:
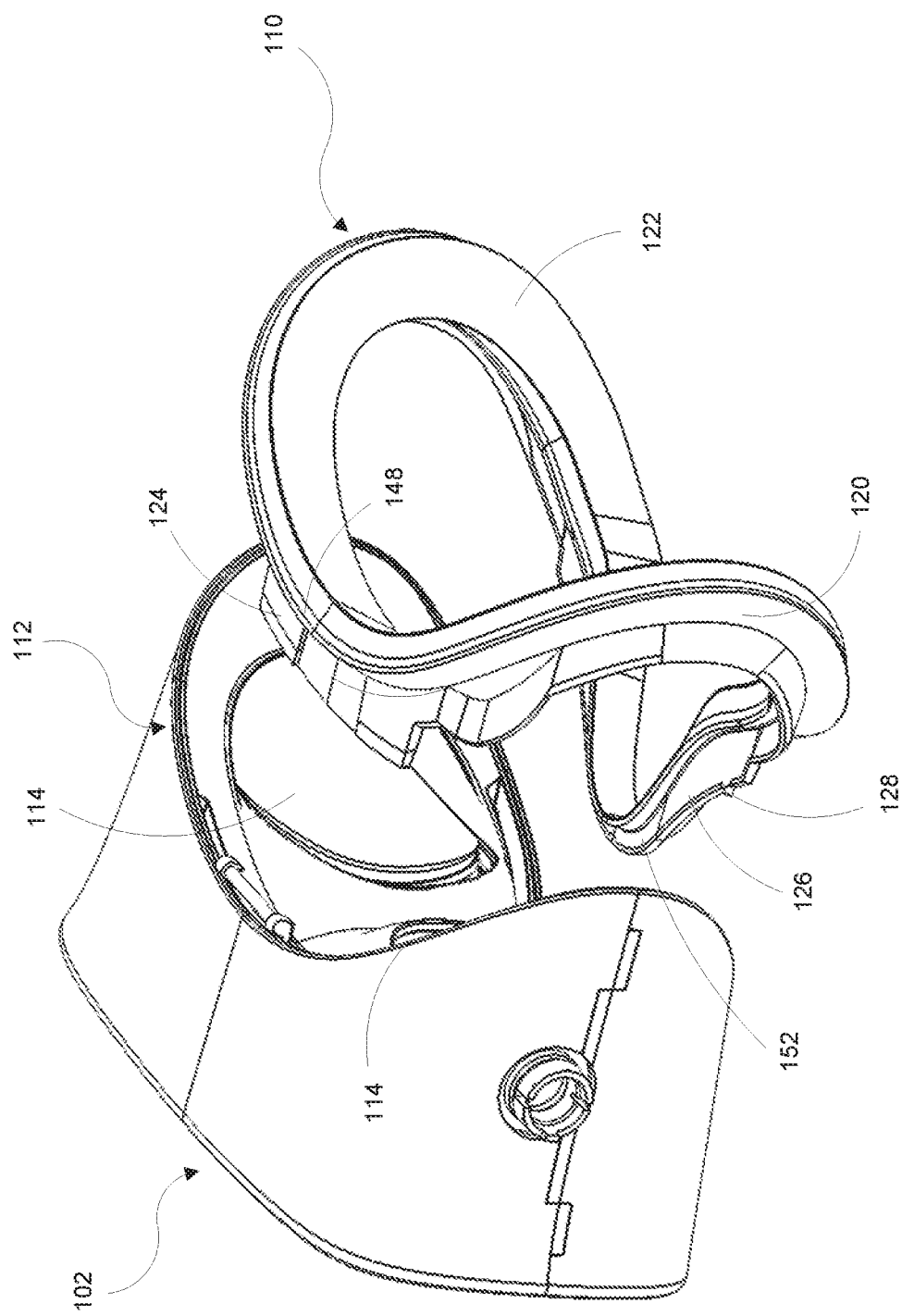
FIG. 2 is a partially exploded isometric view of the head mounted display of FIG. 1 illustrating a facial interface assembly according to a representative embodiment.

As shown in FIG. 2, the display unit 102 includes a housing 112 with one or more display devices (not shown) positioned within the housing 112 and a pair of lenses 114 positioned next to the display devices. The facial interface assembly 110 connects to the housing 112 and sets the distance between the user's face and the lenses 114, as well as providing a comfortable interface between the display unit 102 and the user's face.

The facial interface assembly 110 includes a spacer frame 120 and a face gasket 122 removably attached to the spacer frame 120. The facial interface assembly 110 removably connects to the housing 112 with attachment mounts configured to mate with the housing 112. In the illustrated embodiment, the attachment mounts comprise an upper tab 124 and a lower tab 126. The upper tab 124 extends from the forehead interface portion 148 of the spacer frame 120, and the lower tab 126 extends from the bridge portion 152. The upper tab 124 and the lower tab 126 are contoured or curved to match the curvature of the corresponding portion of the spacer frame 120. The lower tab 126 includes a pair of pins 128 configured to mate with the housing 112.

Figure 3:
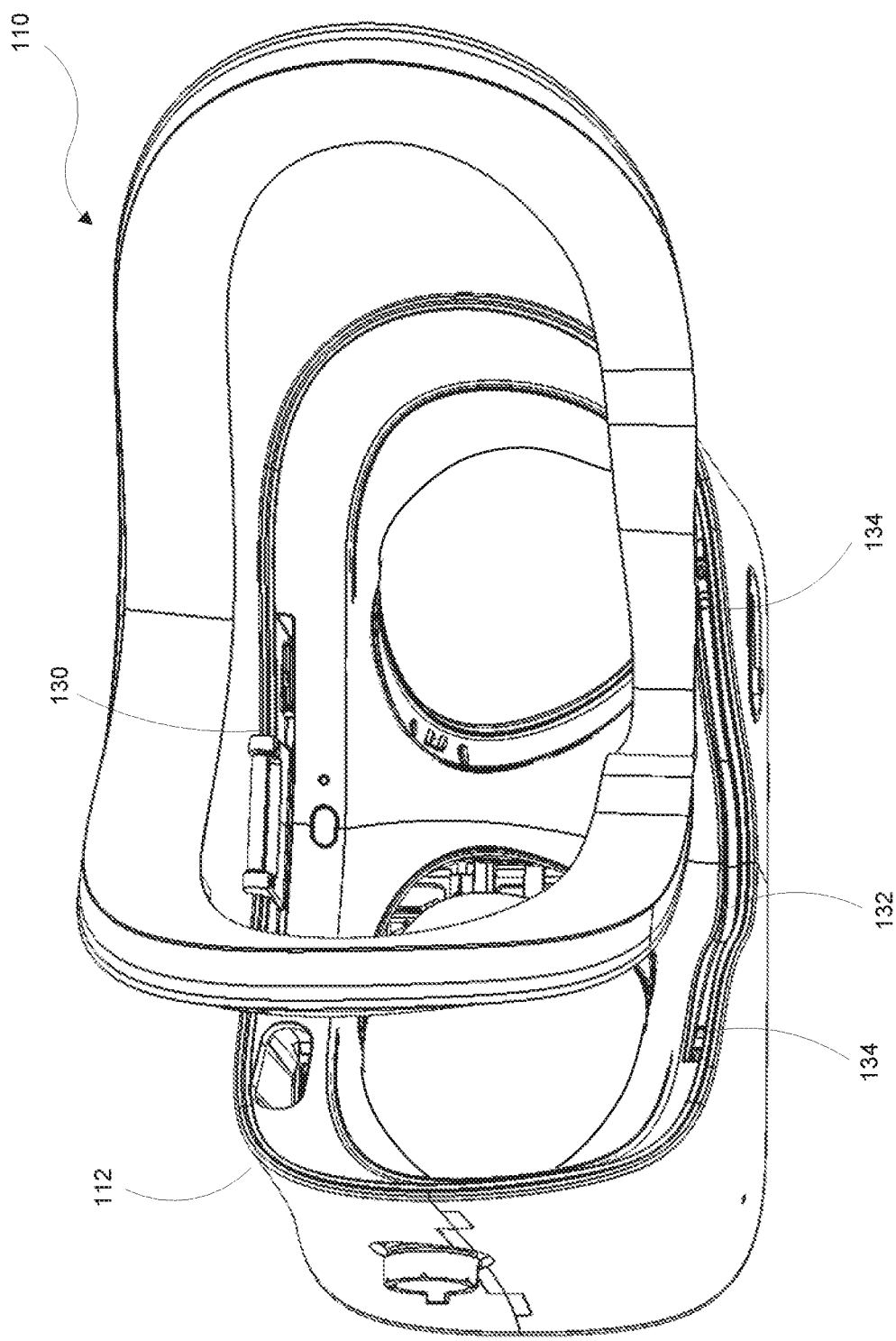
FIG. 3 is an isometric view illustrating the mounts for the facial interface assembly.

With further reference to FIG. 3, the pins 128 mate with corresponding magnets 134 that are positioned in a lower opening or slot 132 formed in the housing 112. The pins 128 and the magnets 134 comprise magnetic couplings to help retain the facial interface assembly 110 in place on the housing. In some embodiments, the pins 128 are comprised of a ferrous material, such as iron or steel. In some embodiments, the magnets 134 can be a cylindrical rare earth magnet, such as neodymium. In some embodiments, the position of the pins 128 and the magnets 134 may be switched such that the pins 128 are positioned in the housing 112, and the magnets 134 are positioned on the lower tab 126. Furthermore, in some embodiments, the pins 128 can be replaced by magnets. As can be appreciated from the figure, the lower opening 132 has a contour corresponding to the contour of the lower tab 126.

Figure 4:
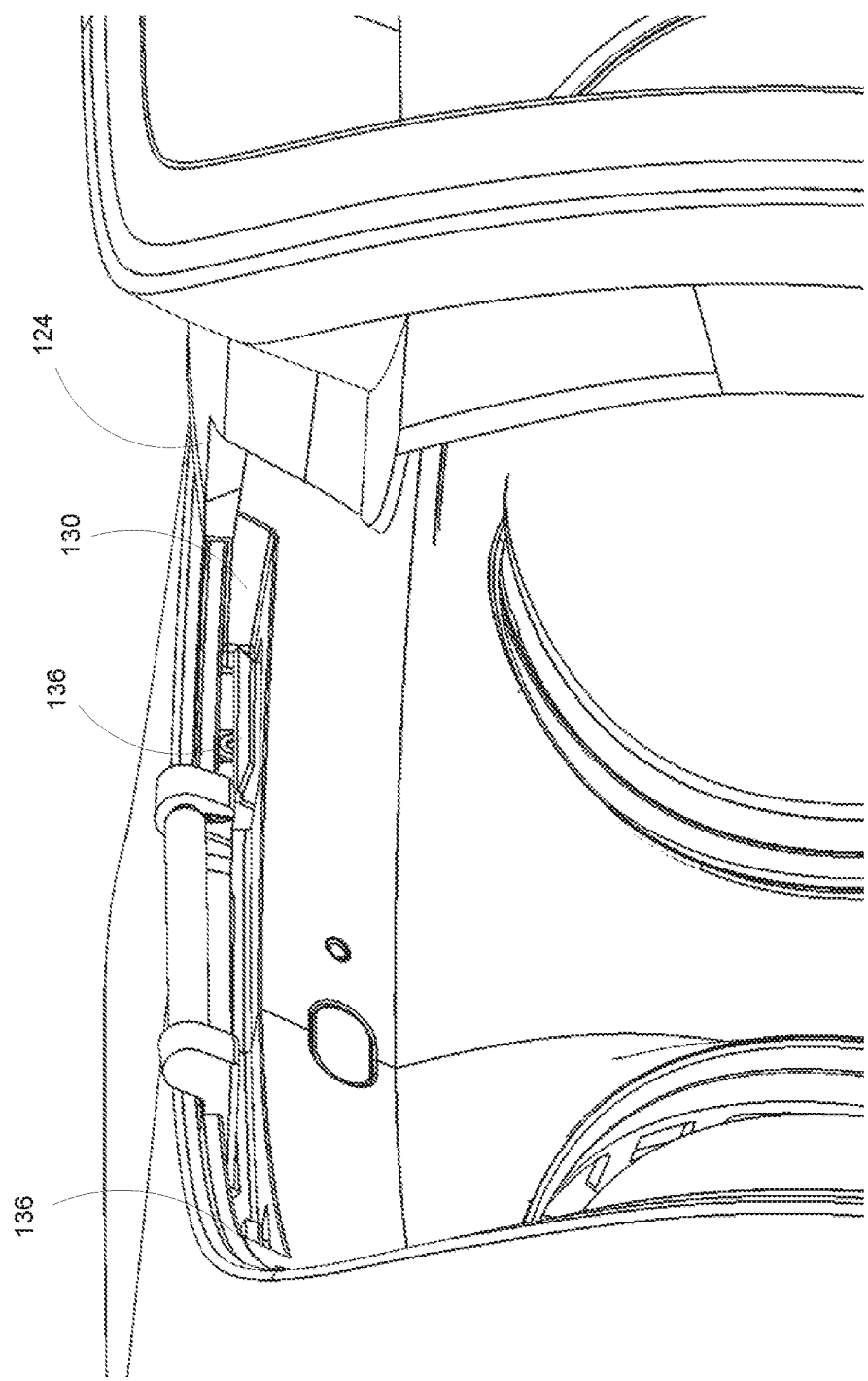
FIG. 4 is a partial isometric view illustrating the location of the facial interface assembly retainer clips.
Figure 5:
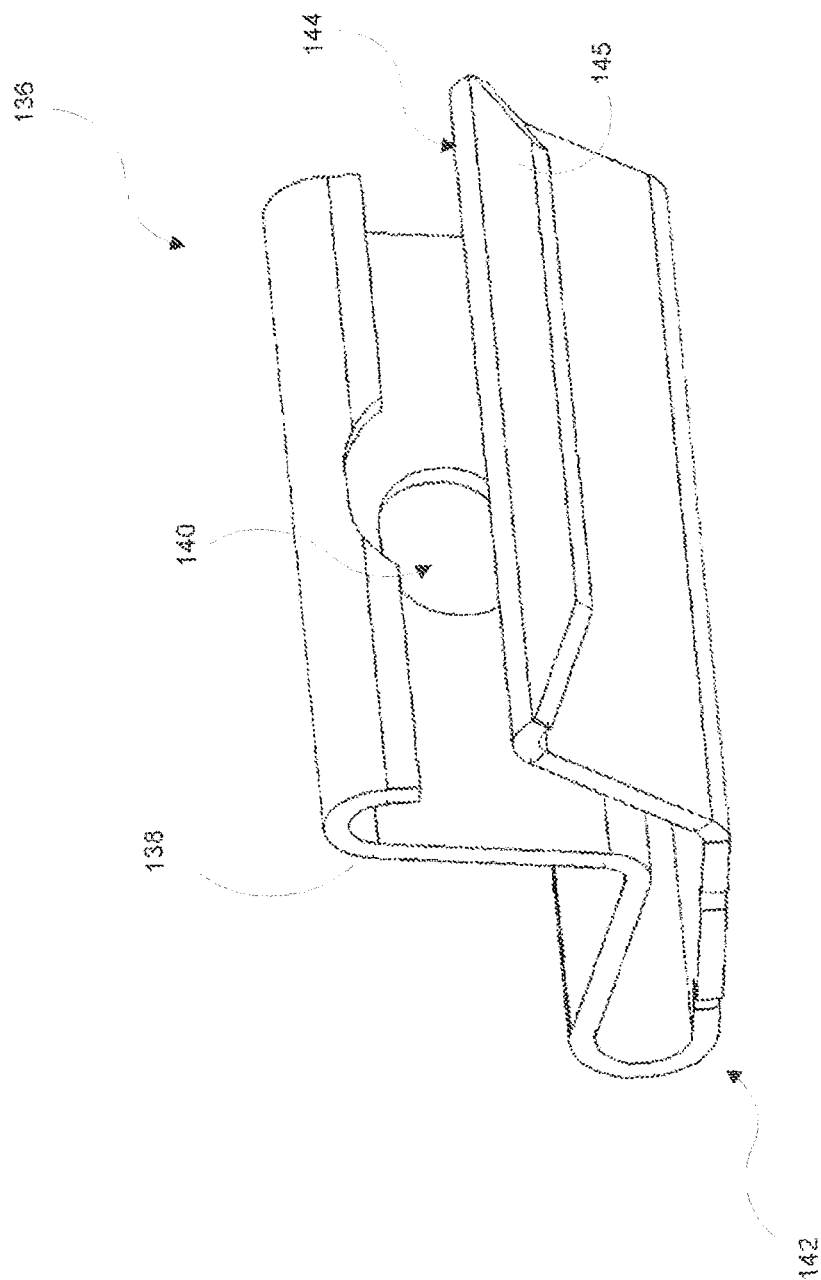
FIG. 5 is an isometric view of the retainer clips shown in FIG. 4.
Figure 6:
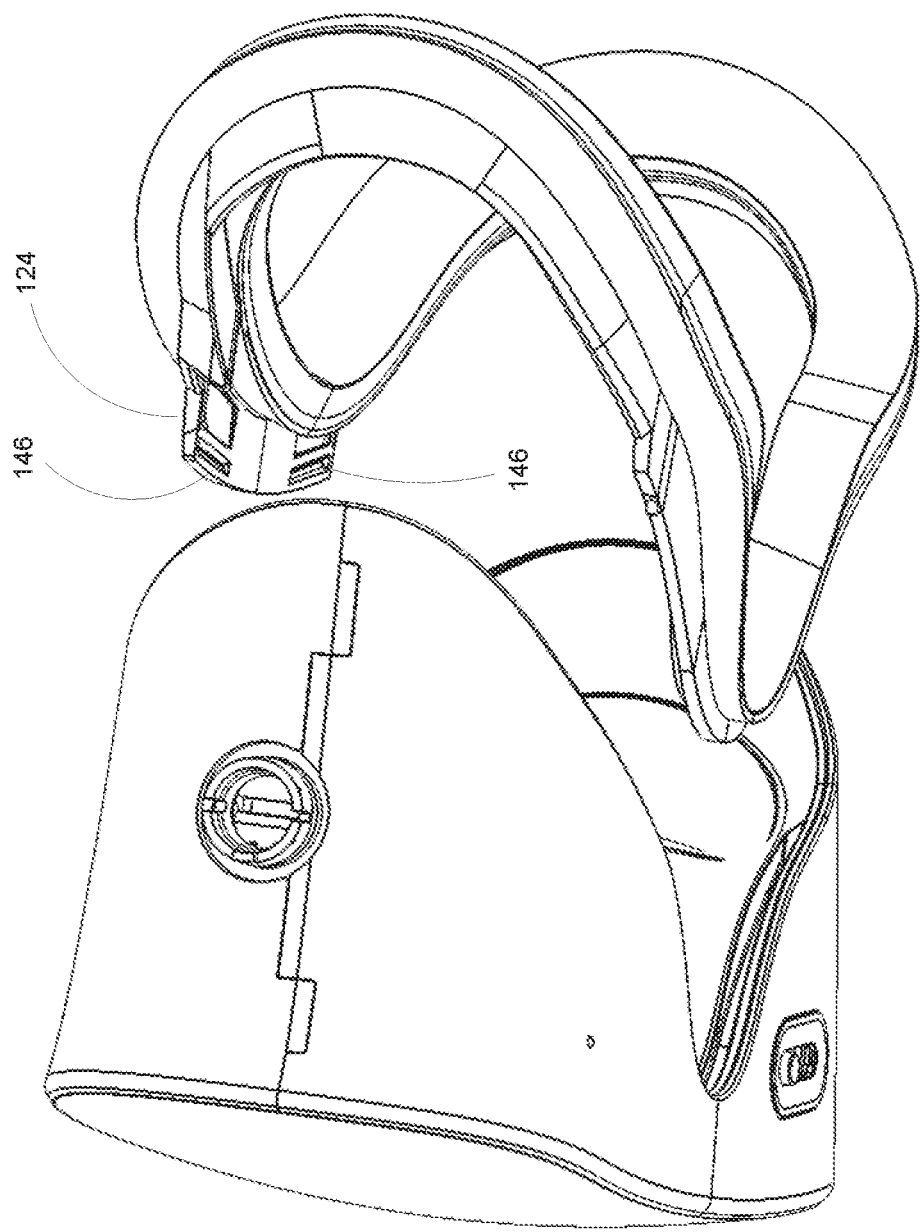
FIG. 6 is an isometric view of the facial interface assembly upper tab illustrating the clip recesses.

The housing 112 also includes an upper opening or slot 130 configured to receive the upper tab 124. As shown in FIG. 4, a pair of retainer clips 136 are positioned adjacent the upper opening 130 and are configured to releasably engage the upper tab 124. Referring to FIG. 5, the retainer clip 136 includes a mounting flange 138 having a mounting hole 140 formed therethrough. A spring portion 142 extends from the mounting flange 138 and supports a clip portion 144. The clip portion 144 can include a lead-in flange 145 to facilitate insertion of the upper tab 124 into the upper opening 130. With further reference to FIG. 6, the upper tab 124 includes a pair of clip recesses 146 sized and configured to receive the clip portions 144 (see FIG. 5). It should be appreciated that although the retainer clips 136 are shown on the upper tab 124 and the magnetic couplings are shown on the lower tab 126 (see FIG. 3), both the upper and the lower tabs 124 and 126 can employ the retainer clips 136 to retain the facial interface assembly 110. Furthermore, it should be appreciated that both the upper tab 124 and the lower tab 126 can employ the magnetic couplings to retain the facial interface assembly 110 on the display unit 102. Other embodiments can use other fastening or engagement features between the facial interface assembly 110 and the housing 112, such as snaps, clips, hook-and-loop fastener, wedged frictional interface, etc.

Figure 7:
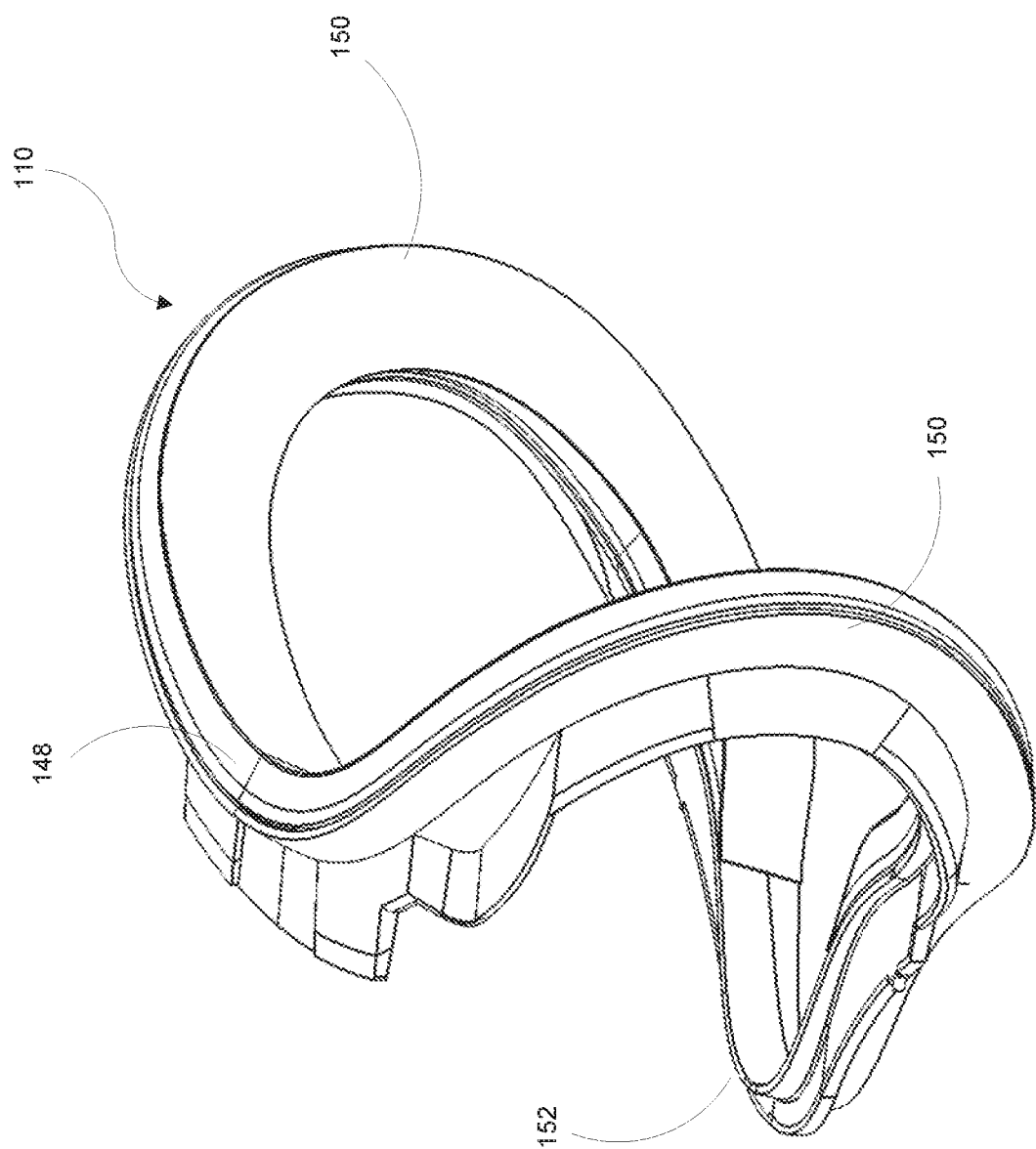
FIG. 7 is an isometric view of the facial interface assembly.
Figure 8:
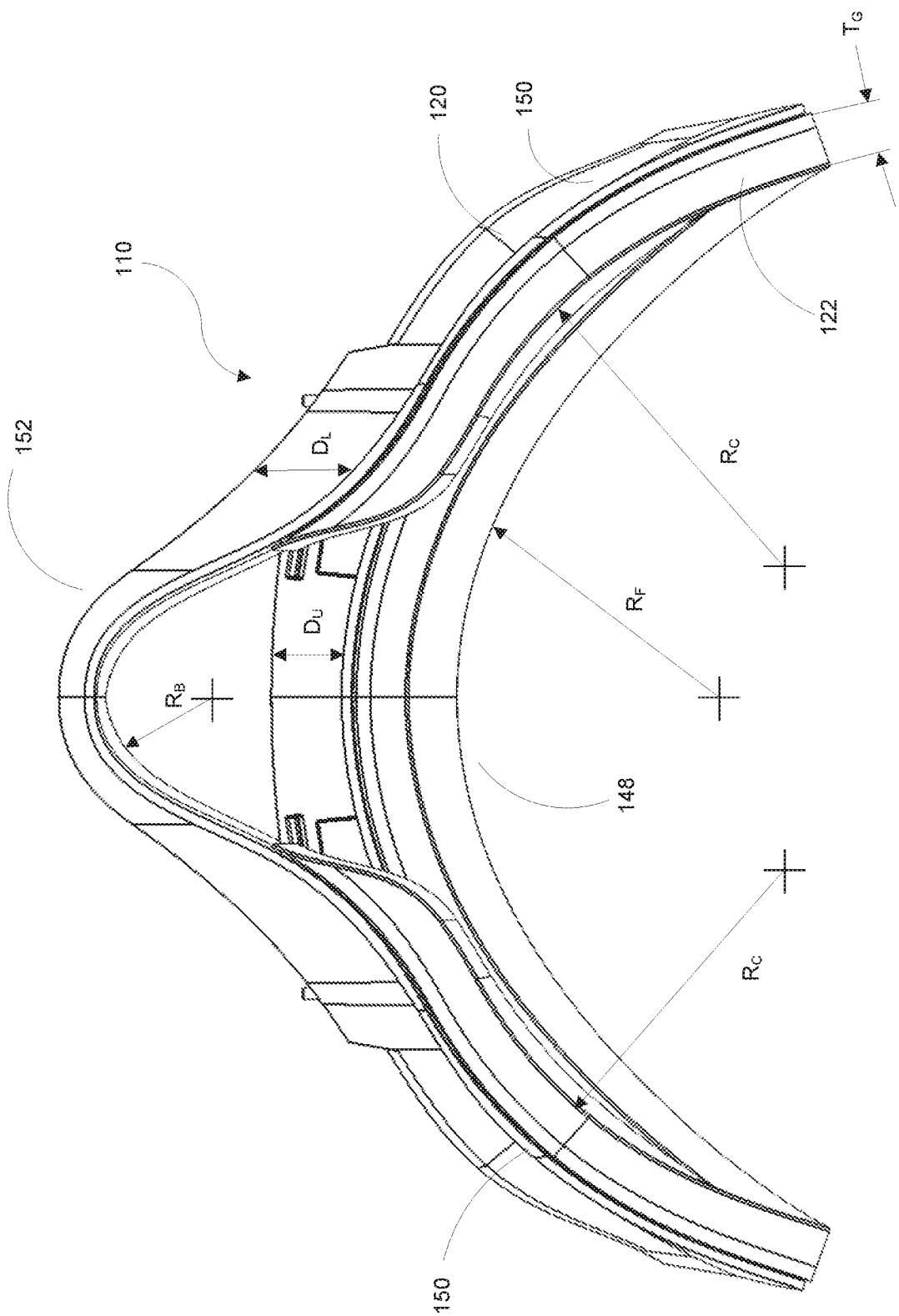
FIG. 8 is a bottom plan view of the facial interface assembly illustrating the radius of curvature for various portions of the facial interface assembly.

As shown in FIG. 7, the facial interface assembly 110 includes a forehead interface portion 148, a pair of cheek interface portions 150, and a bridge portion 152 extending between the cheek interface portions 150. With further reference to FIG. 8, the contours of the facial interface assembly 110 are defined by the spacer frame 120 and the face gasket 122. For example, the forehead interface portion 148 can have a contour generally following a radius of curvature of $R_F$. The cheek interface portions 150 can generally follow a radius of curvature of $R_C$. The bridge portion 152 can generally follow a radius of curvature of $R_B$. In various embodiments of the facial interface assembly 110, different facial structures and shapes can be accommodated by changing these radii of curvature. In some embodiments, the facial interface assembly 110 can be contoured with multiple arcuate surfaces having one or more radii and/or compound radii configurations to generally correspond to the facial features of a user. Furthermore, the distance between a user's face and the head mounted display's housing 112 can be adjusted by installing one of a plurality of face gaskets 122 having a desired thickness $T_G$ and/or installing one of a plurality of as spacer frames 120 having a desired depth Du of the upper tab 124 and depth $D_L$ of the lower tab 126.

Figure 9:
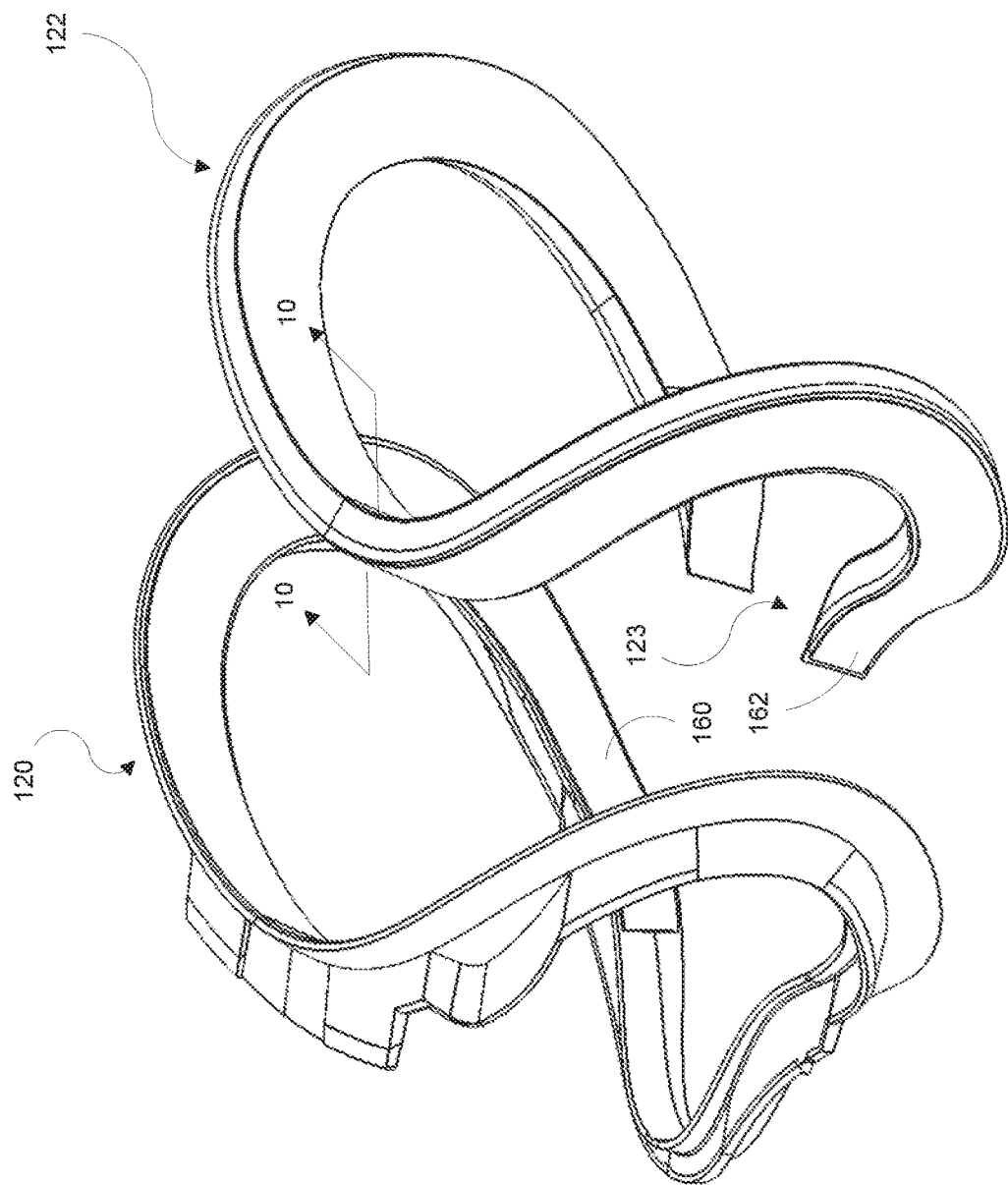
FIG. 9 is an exploded isometric view of the facial interface assembly.

As shown in FIG. 9, the face gasket 122 is removably attachable to the spacer frame 120 with cooperative hook and loop materials 160 and 162, respectively. Accordingly, a first face gasket 122 with selected defined dimensions (e.g., $T_{G1}$, $D_{U1}$, and $D_{L1}$) can be easily removed and interchanged with a selected second face gasket having different configurations and/or defined dimensions (e.g., $T_{G2}$, $D_{U2}$, and $D_{L2}$). Different face gasket configurations can accommodate different facial structures and shapes as well as provide space for users with glasses. In some embodiments, the head mounted display 100 can be provided or made available with a plurality of interchangeable face gaskets 122 of different configurations among which a user can select to best fit the user's face and/or preferences. In some embodiments, the hook and loop materials 160 and 162 are low profile Velcro®. In some embodiments, one of the hook and loop materials 160 and 162 is attached to the spacer frame 120 with a suitable double-sided tape, such as that marketed by 3M® under the part number 9500PC. In some embodiments, a nose section of the face gasket 122 is removed to provide a clearance region 123 for a user's nose.

Figure 10:
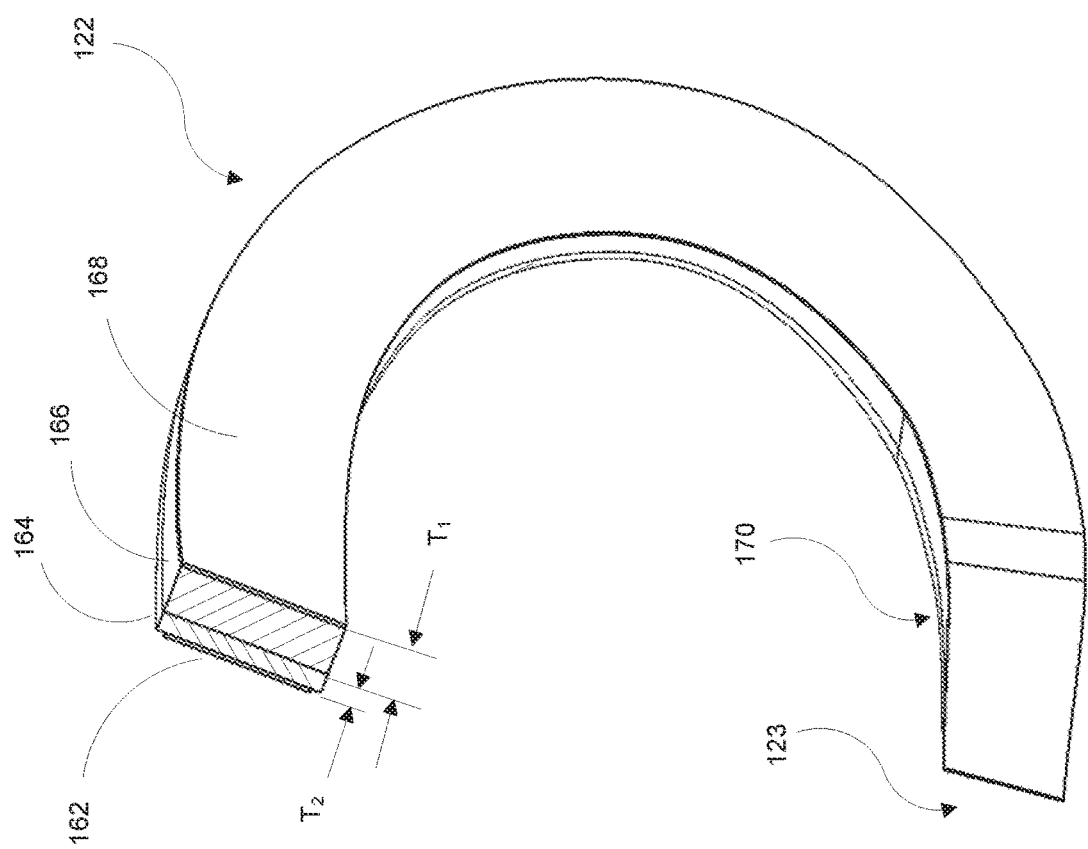
FIG. 10 is a side view in cross-section of the face gasket taken about lines 10-10 in FIG. 9.

As shown in FIG. 10, some embodiments of the face gasket 122 can include a high-density foam layer 164 having a thickness $T_2$ and a low-density foam layer 166 having a thickness $T_1$. The high-density foam layer 164 provides support against the harder surface of the spacer frame 120 while the low-density foam layer 166 provides comfort and compliance to follow the facial features of a user. One of the hook and loop materials 160, 162 is disposed on the high-density foam layer 164. Accordingly, the high-density foam layer 164 is positioned against the spacer frame 120. In some embodiments, a fabric layer 168 is positioned against the low-density foam layer 166 to provide a comfortable surface to interface with the user's face. In some embodiments, portions of the face gasket 122 are tapered such as tapered portion 170 adjacent the clearance region 123.

It should be understood that the thicknesses ($T_1$, $T_2$) of the high- and low-density foam layers can be varied to customize the face gasket 122 for different facial shapes. Furthermore, additional layers may be added along the entirety of a region or only in portions of that region. In some embodiments, the face gasket 122 can be removably attached directly to the head mounted display's housing 112. In some embodiments, face gasket 122 can comprise a single layer of foam. In some embodiments, the foam layers, hook and loop materials, and fabric layer are secured to each other with a suitable adhesive. In some embodiments, a user can remove (e.g., cut) portions of the face gasket 122 to create a custom fit.

Figure 11:
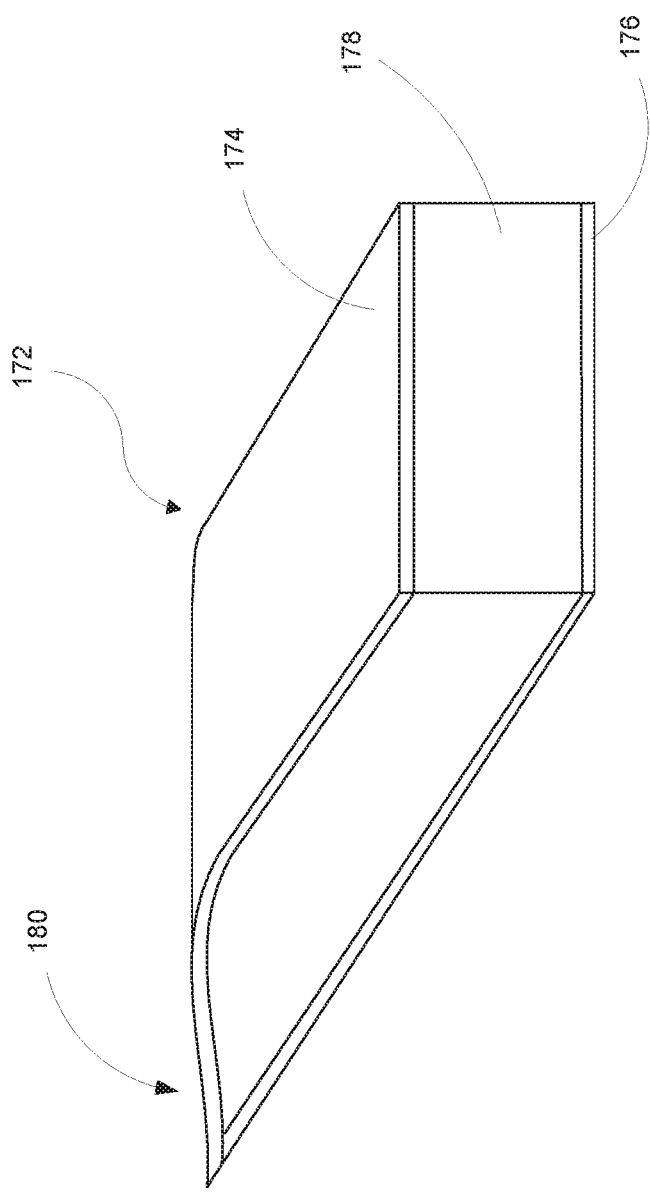
FIG. 11 is an isometric view of a gasket insert.

In some embodiments, one or more gasket inserts 172, such as shown in FIG. 11, can be positioned between face gasket 122 and the spacer frame 120 to provide a customized fit according to a user's preferences. In an embodiment, the gasket insert 172 includes a foam layer 178 with hook and loop materials 174 and 176 positioned on opposite sides of the foam layer 178. The gasket insert 172 can be of different thicknesses and may be tapered on the ends such as tapered portion 180.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A facial interface assembly for use with a head mounted display, comprising:
   a display housing;
   a contoured spacer frame that is removably connectable to the display housing; and
   a face gasket removably attached to the contoured spacer frame, including at least one of:
      at least one foam layer; or
      a fabric layer,
   wherein at least one of the contoured spacer frame or the face gasket has a depth for adjusting a distance between a user's face and the display housing.

2. The facial interface assembly of claim 1, wherein the at least one foam layer of the face gasket comprises at least one of a high-density foam layer or a low-density foam layer.

3. The facial interface assembly of claim 2, wherein the at least one foam layer of the face gasket comprises the high-density foam layer positioned adjacent to the low-density foam layer.

4. The facial interface assembly of claim 1, wherein the face gasket comprises the fabric layer positioned against a surface of the foam layer.

5. The facial interface assembly of claim 1, further comprising a strap assembly coupled to the display housing and configured to hold the display housing against a user's face.

6. The facial interface assembly of claim 1, wherein the contoured spacer frame and the face gasket have a sufficient thickness to provide space for a user to wear glasses while wearing the head mounted display.

7. The facial interface assembly of claim 1, wherein the contoured spacer frame is removably connectable to the display housing via at least one of a tab, a retainer clip, a magnetic coupling, a snap, a hook-and-loop fastener, or a wedged frictional interface.

8. The facial interface assembly of claim 1, wherein the contoured spacer frame comprises a forehead interface portion and a pair of cheek interface portions.

9. The facial interface assembly of claim 8, further comprising a tab extending from the forehead interface portion for removably connecting the contoured spacer frame to the display housing.

10. The facial interface assembly of claim 8, wherein the contoured spacer frame further comprises a bridge portion extending between the cheek interface portions.

11. A head mounted display system, comprising:
    a display unit, including:
       a housing;
       at least one display device; and
       at least one optical lens positioned next to the at least one display device;
    at least one spacer frame that is removably connectable to the housing; and
    at least one face gasket removably attachable to the spacer frame and including one or more compressible layers configured to conform to portions of a user's facial features,
    wherein at least one of the spacer frame or the face gasket has a depth for adjusting a distance between a user's face and the housing.

12. The head mounted display system of claim 11, wherein the at least one spacer frame comprises a plurality of spacer frames having different respective thicknesses.

13. The head mounted display system of claim 11, wherein the at least one face gasket comprises a plurality of face gaskets having different respective depths.

14. The head mounted display system of claim 11, further comprising a gasket insert for positioning between the spacer frame and the face gasket to provide a customized fit of the head mounted display system.

15. A method of wearing a head mounted display, the method comprising:
- selecting a combination of a contoured spacer frame and a face gasket having a combined depth for adjusting a distance between a user's face and a display housing, wherein the face gasket comprises at least one of a foam layer or a fabric layer;
- removably coupling the selected contoured spacer frame and face gasket against the display housing; and
- positioning the face gasket, contoured spacer frame, and display housing against the user's face.

16. The method of claim 15, further comprising:
- removing the selected contoured spacer frame and face gasket from the display housing;
- selecting another, different combination of a contoured spacer frame and a face gasket having a combined different depth for adjusting the distance between the user's face and the display housing; and
- removably coupling the selected other, different combination of the contoured spacer frame and face gasket to the display housing.

17. The method of claim 15, further comprising positioning a gasket insert between the contoured spacer frame and the face gasket to change the combined depth in at least a portion of the combination of the contoured spacer frame and face gasket.

18. The method of claim 15, further comprising positioning a pair of glasses on the user prior to positioning the face gasket, contoured spacer frame, and display housing against the user's face.

19. The method of claim 15, wherein removably coupling the selected contoured spacer frame and face gasket against the display housing comprises securing the selected contoured spacer frame and face gasket to the display housing with at least one of a hook-and-loop fastener, a magnetic coupling, or a tab.

* * * * *